US008640253B2

(12) United States Patent
Struik

(10) Patent No.: US 8,640,253 B2
(45) Date of Patent: Jan. 28, 2014

(54) METHOD AND APPARATUS FOR SYNCHRONIZING AN ADAPTABLE SECURITY LEVEL IN AN ELECTRONIC COMMUNICATION

(75) Inventor: Marinus Struik, Toronto (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

(21) Appl. No.: 13/551,869

(22) Filed: Jul. 18, 2012

(65) Prior Publication Data

US 2012/0284800 A1 Nov. 8, 2012

Related U.S. Application Data

(63) Continuation of application No. 10/921,161, filed on Aug. 19, 2004, now Pat. No. 8,245,279.

(60) Provisional application No. 60/495,874, filed on Aug. 19, 2003.

(51) Int. Cl.
*H04L 29/06* (2006.01)

(52) U.S. Cl.
USPC .......................................................... 726/26

(58) Field of Classification Search
None
See application file for complete search history.

(56) References Cited

U.S. PATENT DOCUMENTS

| 5,099,517 | A | * | 3/1992 | Gupta et al. ..................... 380/29 |
| 5,301,287 | A | | 4/1994 | Herrell et al. |
| 5,450,493 | A | | 9/1995 | Maher |
| 5,638,448 | A | | 6/1997 | Nguyen |
| 5,689,566 | A | | 11/1997 | Nguyen |
| 6,101,543 | A | * | 8/2000 | Alden et al. ................... 709/229 |
| 6,108,583 | A | * | 8/2000 | Schneck et al. ..................... 700/9 |
| 6,118,775 | A | * | 9/2000 | Kari et al. ..................... 370/349 |
| 6,272,632 | B1 | | 8/2001 | Carman et al. |
| 6,510,349 | B1 | * | 1/2003 | Schneck et al. ..................... 700/9 |
| 6,760,768 | B2 | | 7/2004 | Holden et al. |
| 6,782,473 | B1 | | 8/2004 | Park |
| 6,865,426 | B1 | * | 3/2005 | Schneck et al. ..................... 700/9 |
| 6,918,034 | B1 | | 7/2005 | Sengodan et al. |
| 6,928,544 | B2 | | 8/2005 | Chu |
| 7,023,863 | B1 | | 4/2006 | Naudus et al. |
| 7,024,609 | B2 | | 4/2006 | Wolfgang et al. |
| 7,036,015 | B2 | | 4/2006 | Vanstone et al. |

(Continued)

FOREIGN PATENT DOCUMENTS

| EP | 1320010 A2 | 6/2003 |
| EP | 1324541 A2 | 7/2003 |

(Continued)

OTHER PUBLICATIONS

Sung et al.; "Design and Evaluation of Adaptive Secure Protocol for E-Commerce"; Proceedings of the Tenth International Conference on Computer Communications and Networks, Oct. 15-17, 2001, Arizona, U.S.A. pp. 32-39.

(Continued)

*Primary Examiner* — Oscar Louie
(74) *Attorney, Agent, or Firm* — Fish & Richardson P.C.

(57) ABSTRACT

A method of communicating in a secure communication system, comprises the steps of assembling as message at a sender, then determining a security level, and including an indication of the security level in a header of the message. The message is then sent to a recipient.

43 Claims, 5 Drawing Sheets

(56) References Cited

U.S. PATENT DOCUMENTS

| | | | |
|---|---|---|---|
| 7,107,335 B1* | 9/2006 | Arcieri et al. | 709/224 |
| 7,143,137 B2 | 11/2006 | Maufer et al. | |
| 7,233,948 B1 | 6/2007 | Shamoon et al. | |
| 7,302,564 B2 | 11/2007 | Berlin | |
| 7,412,726 B1 | 8/2008 | Viswanath | |
| 7,437,548 B1* | 10/2008 | Alfieri | 713/150 |
| 7,447,313 B2* | 11/2008 | Van Rijnsoever | 380/207 |
| 7,467,406 B2 | 12/2008 | Cox et al. | |
| 7,526,807 B2 | 4/2009 | Chao et al. | |
| 7,600,038 B2 | 10/2009 | Struik | |
| 7,657,531 B2 | 2/2010 | Bisbee et al. | |
| 7,660,986 B1* | 2/2010 | Qiu et al. | 713/166 |
| 7,965,843 B1* | 6/2011 | Maino et al. | 380/256 |
| 8,069,483 B1 | 11/2011 | Matlock | |
| 2002/0035635 A1 | 3/2002 | Holden et al. | |
| 2002/0090086 A1* | 7/2002 | Van Rijnsoever | 380/207 |
| 2003/0026255 A1 | 2/2003 | Poeluev et al. | |
| 2003/0035542 A1 | 2/2003 | Kim | |
| 2003/0119484 A1 | 6/2003 | Adachi et al. | |
| 2003/0226011 A1 | 12/2003 | Kuwano et al. | |
| 2004/0010691 A1 | 1/2004 | Nelson | |
| 2004/0028409 A1 | 2/2004 | Kim et al. | |
| 2004/0136527 A1 | 7/2004 | Struik | |
| 2004/0139312 A1 | 7/2004 | Medvinsky | |
| 2004/0255001 A1 | 12/2004 | Oh et al. | |
| 2005/0015583 A1* | 1/2005 | Sarkkinen et al. | 713/150 |
| 2005/0076197 A1 | 4/2005 | Struik | |
| 2005/0081032 A1 | 4/2005 | Struik | |
| 2005/0086501 A1 | 4/2005 | Woo et al. | |
| 2005/0108746 A1 | 5/2005 | Futagami et al. | |
| 2006/0064736 A1 | 3/2006 | Ahuja et al. | |
| 2006/0112431 A1 | 5/2006 | Finn et al. | |
| 2006/0140400 A1 | 6/2006 | Brown et al. | |
| 2006/0210071 A1 | 9/2006 | Chandran et al. | |
| 2007/0058633 A1 | 3/2007 | Chen et al. | |
| 2007/0160059 A1 | 7/2007 | Poeluev et al. | |
| 2007/0195788 A1 | 8/2007 | Vasamsetti et al. | |
| 2007/0255954 A1 | 11/2007 | Struik | |
| 2008/0177997 A1 | 7/2008 | Morais et al. | |
| 2008/0307524 A1 | 12/2008 | Singh et al. | |
| 2009/0319775 A1 | 12/2009 | Buer et al. | |
| 2011/0264915 A1 | 10/2011 | Cam-Winget et al. | |

FOREIGN PATENT DOCUMENTS

| | | |
|---|---|---|
| EP | 1326157 A2 | 7/2003 |
| WO | 00/10304 | 2/2000 |
| WO | 03/036857 | 5/2003 |
| WO | 2005081032 | 4/2005 |
| WO | 2005083970 A1 | 9/2005 |

OTHER PUBLICATIONS

International Search Report from International Application No. PCT/CA2007/000608; dated Aug. 28, 2007; 4 pages
Search Report from GB Application No. GB0623685.5; dated Mar. 15, 2007; 1 page.
Hura et al.; "Data and Computer Communications: Networking and Internetworking"; CRC Press, 2001 pp. 337, 450, 453, 467, 471, 483, 484, 485, 489, 491, 526, 599, 609, 617, 618, 521, 937, 1086, 1117, 1118, 1132.
"Transmission Control Protocol"; RFC 0973; Darpa Internet Program, Information Sciences Institute, University of Southern California, Sep. 1981.
Dierks, T. et al.; "The TLS Protocol"; RFC 2246; IETF; Jan. 1999; pp. 23, 28-30.
IEEE Standard 802.11; Standard for Telecommunications and Information Exchange between Systems—Local and Metropolitan Networks—Specific Requirements—Part 11: Wireless LAN Medium Access Control (MAC) and Physical Layer (PHY) Specifications; IEEE Press; 1999; pp. 34-41, 50-58.
Kent, S. et al.; "IP Authentication Header"; RFC 2402; IETF; Nov. 1998; 21 pages.
Kent, S. et al.; "Security Architecture for the Internet Protocol"; RFC 2401; IETF; Nov. 1998; 62 pages.
Specification of the Bluetooth System; Specification vol. 1—Core, Version 1.0B; Dec. 1, 1999; p. 160.
Office Action issued in U.S. Appl. No. 10/885,115 on Aug. 22, 2007; 10 pages.
Office Action issued in U.S. Appl. No. 10/885,115 on Jun. 23, 2008; 13 pages.
Advisory Action issued in U.S. Appl. No. 10/885,115 on Aug. 28, 2008; 3 pages.
Office Action issued in U.S. Appl. No. 10/885,115 on Oct. 27, 2008; 16 pages.
Office Action issued in U.S. Appl. No. 10/885,115 on May 8, 2009; 18 pages.
Office Action issued in U.S. Appl. No. 10/885,115 on Oct. 2, 2009; 16 pages.
Office Action issued in U.S. Appl. No. 10/885,115 on Jun. 4, 2010; 13 pages.
Advisory Action issued in U.S. Appl. No. 10/885,115 on Aug. 25, 2010; 3 pages.
Office Action issued in U.S. Appl. No. 10/885,115 on Jan. 21, 2011; 13 pages.
Office Action issued in U.S. Appl. No. 10/885,115 on Oct. 11, 2011; 14 pages.
Office Action issued in Canadian Application No. 2,434,992 on Sep. 14, 2011; 3 pages.
Search Report issued in U.K. Application No. 0418565.8 on Jan. 25, 2005; 4 pages.
Examination Report issued in U.K. Application No. 0418565.8 on Oct. 31, 2005; 7 pages.
Examination Report issued in U.K. Application No. 0418565.8 on Feb. 15, 2006; 2 pages.
Examination Report issued in U.K. Application No. 0418565.8 on Aug. 23, 2006; 3 pages.
Combined Search and Examination Report issued in U.K. Application No. 0721922.3 on Dec. 18, 2007; 5 pages.
Office Action issued in U.S. Appl. No. 11/735,055 on Jul. 13, 2010; 21 pages.
Office Action issued in U.S. Appl. No. 11/735,055 on Dec. 22, 2010; 14 pages.
Office Action issued in Chinese Application No. 200780020042.X on Jan. 14, 2004; 10 pages.
Extended European Search Report issued in European Patent Application No. 07719535.2 on May 13, 2011; 6 pages.
Official Action issued in Japanese Application No. 2009-504535 on Aug. 17, 2011; 9 pages.
Office Action issued in U.S. Appl. No. 10/921,161 on Mar. 25, 2008; 24 pages.
Office Action issued in U.S. Appl. No. 10/921,161 on Nov. 25, 2008; 30 pages.
Office Action issued in U.S. Appl. No. 10/921,161 on Dec. 9, 2009; 25 pages.
Office Action issued in U.S. Appl. No. 10/921,161 on Aug. 18, 2010; 27 pages.
Office Action issued in U.S. Appl. No. 10/921,161 on Jan. 27, 2011; 30 pages.
Examiner's Answer to Appeal Brief issued in U.S. Appl. No. 10/921,161 on Feb. 21, 2012; 30 pages.
Notice of Allowance issued in U.S. Appl. No. 10/921,161 on Apr. 12, 2012; 9 pages.
Office Action issued in U.S. Appl. No. 11/735,055 on Feb. 17, 2012; 14 pages.
Office Action issued in Canadian Application No. 2,478,274 on Feb. 3, 2012; 2 pages.
Office Action issued in Canadian Application No. 2,644,015 on May 23, 2012; 3 pages.
Office Action issued in Chinese Application No. 200780020042.X on Mar. 21, 2012; 10 pages.
Communication Purusant to Article 94(4) EPC issued in European Application No. 07719535.2 on Feb. 17, 2012; 5 pages.
Office Action issued in U.S. Appl. No. 11/735,055 on May 24, 2013; 16 pages.

(56) References Cited

OTHER PUBLICATIONS

Notice of Allowance issued in Chinese Application No. 200780020042.X on May 6, 2013; 4 pages.
Notice of Allowance issued in Japanese Application No. 2011-251567 on Apr. 23, 2013; 3 pages.
Office Action issued in Korean Application No. 10-2008-7027745 on Jun. 28, 2013; 6 pages.
Office Action issued in U.S. Appl. No. 10/885,115 on Jul. 1, 2013; 17 pages.
Office Action issued in Chinese Application No. 200780020042.X on Aug. 13, 2012; 9 pages.
Examination Report issued in German Application No. 102004040312.0 on Oct. 24, 2012; 15 pages.
Office Action issued in U.S. Appl. No. 11/735,055 on Dec. 11, 2012; 15 pages.
Office Action issued in Canadian Application No. 2,434,992 on Dec. 5, 2012; 2 pages.
Office Action issued in Chinese Application No. 200780020042.X on Dec. 17, 2012; 7 pages.
Office Action issued in Canadian Application No. 2,478,274 on Mar. 14, 2013; 3 pages.
Communication Pursuant to Article 94(4) EPC issued in European Application No. 07719535.2 on Mar. 8, 2013; 5 pages.

* cited by examiner

METHOD AND APPARATUS FOR SYNCHRONIZING AN ADAPTABLE SECURITY LEVEL IN AN ELECTRONIC COMMUNICATION

CLAIM OF PRIORITY

This application claims priority under 35 USC §120 to U.S. patent application Ser. No. 10/921,161, filed on Aug. 19, 2004, which claims priority to U.S. Patent Application Ser. No. 60/495,874, filed on Aug. 19, 2003, the entire contents of which are hereby incorporated by reference.

BACKGROUND OF THE INVENTION

1. Field of the Invention

The present invention relates to a method and apparatus for providing synchronizing an adaptable security level in an electronic communication.

2. Description of the Prior Art

In electronic communications, it is often necessary to prevent an eavesdropper from intercepting a message. It is also desirable to have an indication of the authenticity of a message, that is a verifiable identification of the sender. These goals are usually achieved through the use of cryptography. Private key cryptography requires sharing a secret key prior to initiating communications. Public key cryptography is generally preferred as it does not require such a shared secret key. Instead, each correspondent has a key pair including a private key and a public key. The public key may be provided by any convenient means, and does not need to be kept secret.

There are many variations in cryptographic algorithms, and various parameters that determine the precise implementation. In standards for wireless communications, it has been customary to set these parameters in advance for each frame type. However, this approach limits the flexibility of the parameters.

When one device is communicating with several other devices, it will often need to establish separate parameters for each communication.

It is an object of the present invention to obviate or mitigate the above disadvantages.

SUMMARY OF THE INVENTION

In accordance with one aspect of the present invention, there is provided a method of communicating in a secure communication system, comprising the steps of assembling as message at a sender, then determining a security level, and including an indication of the security level in a header of the message. The message is then sent to a recipient.

In accordance with another aspect of the present invention, there is provided a method of providing a security level to a sender by including information in an acknowledgement message.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
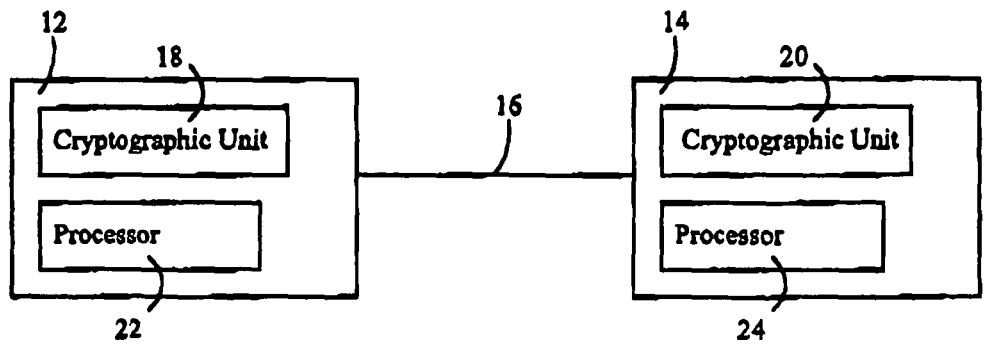
FIG. 1 is a schematic representation of a communication system.

Referring to FIG. 1, a communication system 10 includes a pair of correspondents 12, 14 connected by a communication link 16. Each correspondent 12, 14 includes a respective cryptographic unit 18, 20.

Each correspondent 12, 14 can include a processor 22, 24. Each processor may be coupled to a display and to user input devices, such as a keyboard, mouse, or other suitable devices. If the display is touch sensitive, then the display itself can be employed as the user input device. A computer readable storage medium is coupled to each processor 22, 24 for providing instructions to the processor 22, 24 to instruct and/or configure processor 22, 24 to perform steps or algorithms related to the operation of each correspondent 12, 14, as further explained below. The computer readable medium can include hardware and/or software such as, by way of example only, magnetic disks, magnetic tape, optically readable medium such as CD ROM's, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM provided in a support system. It should be noted that the above listed example mediums can be used either alone or in combination.

Figure 2:
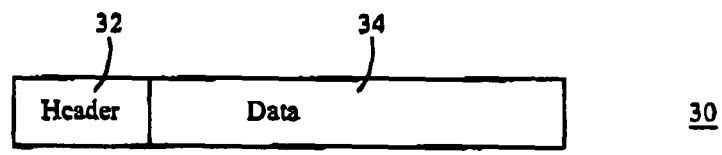
FIG. 2 is a schematic representation of an information frame exchanged in the communication system of FIG. 1.

Referring to FIG. 2, a frame used in communications between the correspondents 12, 14 is shown generally by the numeral 30. The frame 30 includes a header 32 and data 34. The header 32 includes information about the source and destination of the frame 30 and is used for processing frames. The header 32 may contain other control information as will be understood by those skilled in the art.

Figure 3:
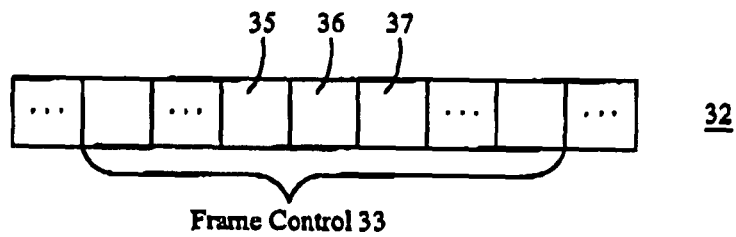
FIG. 3 is a schematic representation of a frame control portion of the frame of FIG. 2.

Referring to FIG. 3, the header 32 also contains frame control bits 33. The frame control bits 33 include security bits 35, 36, and 37. Security bit 35 indicates whether encryption is on or off. Security bits 36 and 37 together indicate the integrity level, such as 0, 32, 64, or 128 bits. It will be recognized that providing security bits in each frame allows the security level to be modified on a frame-by-frame basis rather than on the basis of a pair of correspondents, therefore providing greater flexibility in organizing communications.

In order to provide security, certain minimum security levels may be used. These levels should be decided upon among all of the correspondents through an agreed-upon rule. This rule may be either static or dynamic.

Figure 4:
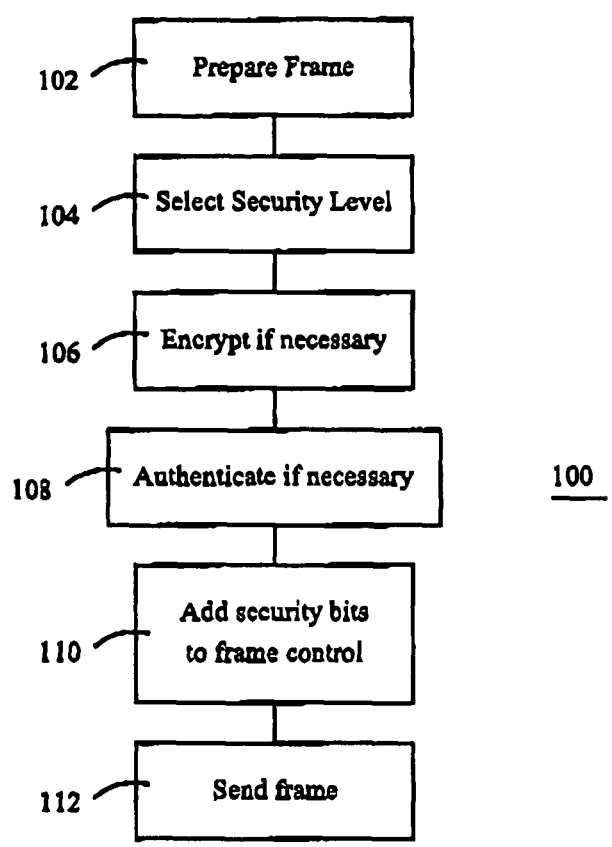
FIG. 4 is a schematic representation of a method performed by a sender in FIG. 1.

In operation, the correspondent 12 performs the steps shown in FIG. 4 by the numeral 100 to send information to the correspondent 14. First, the correspondent 12 prepares data and a header at step 102. Then it selects the security level at step 104. The security level is determined by considering the minimum security level required by the recipient, the nature of the recipient, and the kind of data being transmitted. If the security level includes encryption, then the correspondent 12 encrypts the data at step 106. If the security level includes authentication, then the correspondent 12 signs the data at step 108. Then the correspondent 12 includes bits indicating the security level in the frame control at step 110. The correspondent 12 then sends the frame to the correspondent 14.

Figure 5:
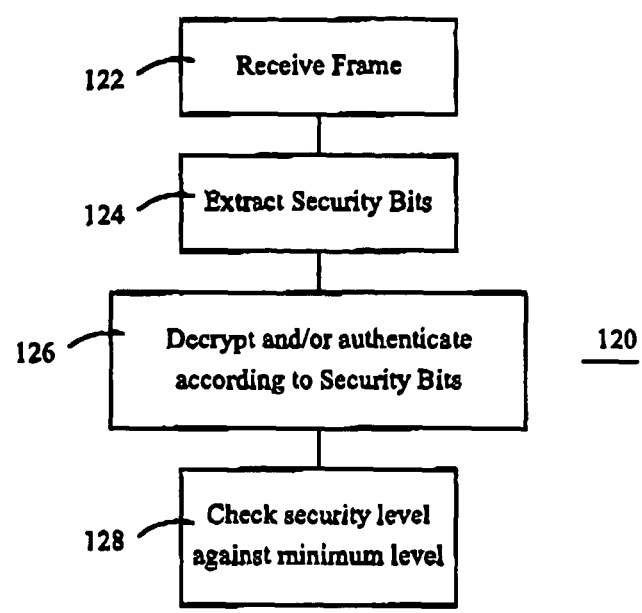
FIG. 5 is a schematic representation of a method performed by a recipient in FIG. 1.

Upon receiving the frame, the correspondent 14 performs the steps shown in FIG. 5 by the numeral 120. The correspondent 14 first receives the frame at step 122. It then extracts the security bits at step 124. If the security bits indicate encryption, then the correspondent 14 decrypts the data at step 126. If the security bits indicate authentication, then the correspondent 14 verifies the signature at step 126. Finally, the correspondent 14 checks the security level to ensure it meets predetermined minimum requirements. If either the encryption or authentication fails, or if the security level does not meet the minimum requirements, then the correspondent 14 rejects the message.

It will be recognized that providing security bits and an adjustable security level provides flexibility in protecting each frame of the communication. It is therefore possible for the sender to decided which frames should be encrypted but not authenticated. Since authentication typically increases the length of a message, this provides a savings in constrained environments when bandwidth is at a premium.

In a further embodiment, the correspondent 12 wishes to send the same message to multiple recipients 14 with varying minimum security requirements. In this case, the correspondent 12 chooses a security level high enough to meet all of the requirements. The correspondent 12 then proceeds as in FIG. 4 to assemble and send a message with the security level. The message will be accepted by each recipient since it meets each of their minimum requirements. It will be recognized that this embodiment provides greater efficiency than separately dealing with each recipient's requirements.

In another embodiment, a different number of security bits are used. The actual number of bits is not limited to any one value, but rather may be predetermined for any given application. The security bits should indicate the algorithm parameters. They may be used to determine the length of a key as 40 bits or 128 bits, the version of a key to be used, or any other parameters of the encryption system.

Figure 6:
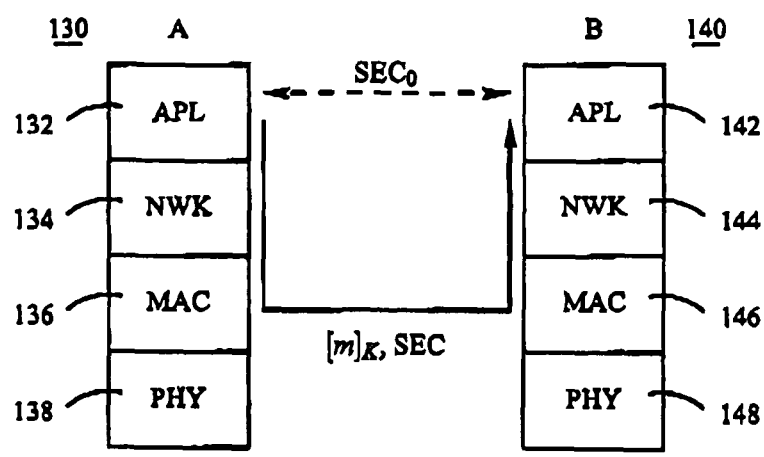
FIG. 6 is a schematic representation of a network protocol used in one embodiment of the communication system.

It will be recognized that in the above embodiments, a network stack may be used to organize communications between the correspondents. Referring therefore to FIG. 6, the a network stack of correspondent A is shown by the numeral 130. A network stack of correspondent B is shown by the numeral 140. The network stacks are organized into layers and have similar structures. The network stack 130 includes an application layer (APL) 132, a network layer (NWK) 134, a message authentication layer (MAC) 136, and a physical layer (PHY) 138. The network stack 140 includes similar components with similar numbering.

The sender determines how he wants to protect payload (and where to protect it, i.e., which layer). For the APL layer, security should be transparent; its role is limited to indicating at which level it wants to protect data (i.e., security services: none, confidentiality, data authenticity, or both). The actual cryptographic processing then is delegated to lower layers.

The recipient determines whether or not to accept protected payload, based on the received frame and locally maintained status information. The outcome of the cryptographic processing (done at the same layer as that of the sender), including info on the apparently offered protection level, is passed to the application layer, who determines whether the offered protection level was adequate. The recipient may acknowledge proper receipt of the frame to the original sender, based on this 'adequacy test'.

The acknowledgement (ACK), if present, is then passed back to the sender and passed up to the appropriate level (if protected message sent at APL layer, then ACK should also arrive back at that level; similar for lower layers of course).

The sender A determines that it wants to protect payload m using the protection level indicated by SEC (taking into account its own security needs and, possibly, those of its intended recipient(s). The payload m and desired protection level SEC is then passed to a lower layer (e.g., the MAC layer, as in the diagram) which takes care of the actual cryptographic processing. (This message passing could include additional status information that aids in the processing of the frame, such as the intended recipient(s), fragmentation info, etc. Note that the delegation of the cryptographic processing to a lower layer is only a conceptual step if cryptographic processing takes place at the same layer at which the payload m originates.) Cryptographic processing involves protecting the payload m and, possibly, associated information such as frame headers, using the cryptographic process indicated by the desired protection level SEC. The key used to protect this information is derived from shared keying material maintained between the sender and the intended recipient(s). After cryptographic processing, the protected frame, indicated by [m]K, SEC in FIG. 6, is communicated to the intended recipient(s) B.

The intended recipient (s) retrieves the payload m' from the received protected frame, using the cryptographic process indicated by the observed protection level SEC', using a key that is derived from shared keying material maintained between the sender and the recipient(s) in question. The retrieved payload m' and the observed protection level SEC' is passed to the same level at which the payload was originated by the sender, where the adequacy of the observed protection level is determined. The observed protection level SEC' is deemed sufficient, if it meets or exceeds the expected protection level $SEC_0$, where the parameter $SEC_0$ might be a fixed pre-negotiated protection level that does or does not depend on the retrieved payload m' in question. (Defining $SEC_0$ in a message-dependent way would allow fine-grained access control policies, but generally involves increased storage and processing requirements.)

The above approach works in contexts where expected and observed protection levels can be compared, i.e., where the set of protection levels is a partial ordering. An example is the context where protection involves a combination of encryption and/or authentication, with as ordering the Cartesian product of the natural ordering for encryption (encryption OFF<Encryption ON) and the natural ordering of authentication (ordered according to increasing length of data authenticity field). Moreover, if the set of protection levels has a maximum element, then the sender can use this maximum protection level to ensure that (unaltered) messages always pass the adequacy test.

In the above embodiments, each sender has to pre-negotiate the minimum expected protection level $SEC_0$ with each intended recipient. Thus, the approach might not be as adaptive as desirable for some applications and may involve additional protocol overhead at every change of the $SEC_0$ parameter. These disadvantages can be overcome by using the acknowledgement (ACK) mechanism from recipient(s) to sender as a feedback channel for passing the $SEC_0$ info. This is performed by incorporating in each acknowledgement message an indication as to the expected protection level. This information can then be collated by the original sender to update the minimum protection level expected by its recipient(s), whether or not this is message-dependent or not.

Figure 7:
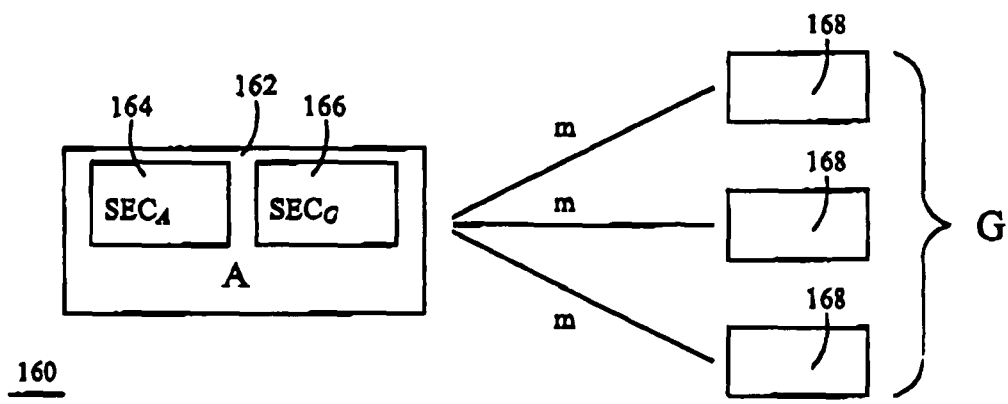
FIG. 7 is a schematic representation of an embodiment of the communication system.

In a further embodiment, a method of synchronizing security levels is shown. Referring to FIG. 7, another embodiment of the communication system is shown generally by the numeral 160. The system includes a sender A 162 and recipients 168 in a group labelled G. The sender A includes parameters $SEC_A$ 164 and $SEC_G$ 166.

Sender A wants to securely communicate a message m to a group G of devices. The sender A has access to the two parameters, i.e., (1) The minimum level $SEC_A$ at which it would like to protect this message (in general, $SEC_A$ might depend on the group it sends information to and the message itself, so proper notation would be $SEC_A$ (m,G));

(2) The minimum protection level $SEC_G$ that the group G of recipients expects (again, the proper notation would be $SEC_G$(m,A) if this level would depend on the sender and the message itself as well). Here, the minimum expectation level of a group is the maximum over all group members of the minimum expectation level for each group member.

Initialization

Sender A assumes that each parameter $SEC_G$ is set to the maximum protection level (for each group G it securely communicates with).

Operational Usage

Sender A determines the minimum protection level $SEC_A$ at which it wants to protect the message m. The actual protection level SEC applied to the message m meets both its own adequacy test (i.e., $SEC \geq SEC_A$) and the minimum expected level by the group G (i.e., $SEC \geq SECG$).

Each recipient B that is in the group G of recipients (i.e., B∈G) indicates in its secure acknowledgement message the minimum expected protection level (for sender A and message m) at that particular moment of time.

A updates the parameter $SEC_G$ such that it is consistent with all the minimum protection levels indicated in each of the acknowledgement messages it received back (i.e., SECG≥SECB for all responding devices B).

Note that the procedure described above sends messages with a protection level that satisfies both the needs of the sender and expectations of recipient(s) and is adaptable to changes herein over time. Alternatively, the sender might only take its own protection needs into account, at the cost of potentially sending messages that will be rejected by one or more recipients due to insufficient—since less than expected—protection level.

The procedure described above can be generalized towards a general self-synchronization procedure for status information among devices in any network topology, where the feedback info on status information may be partially processed along the feedback path from recipient(s) towards sender already, rather than at the sender itself only (in the example above, this graph is a tree with root A and leaves the recipient(s) and the synchronization involves a specific security parameter).

Figure 8:
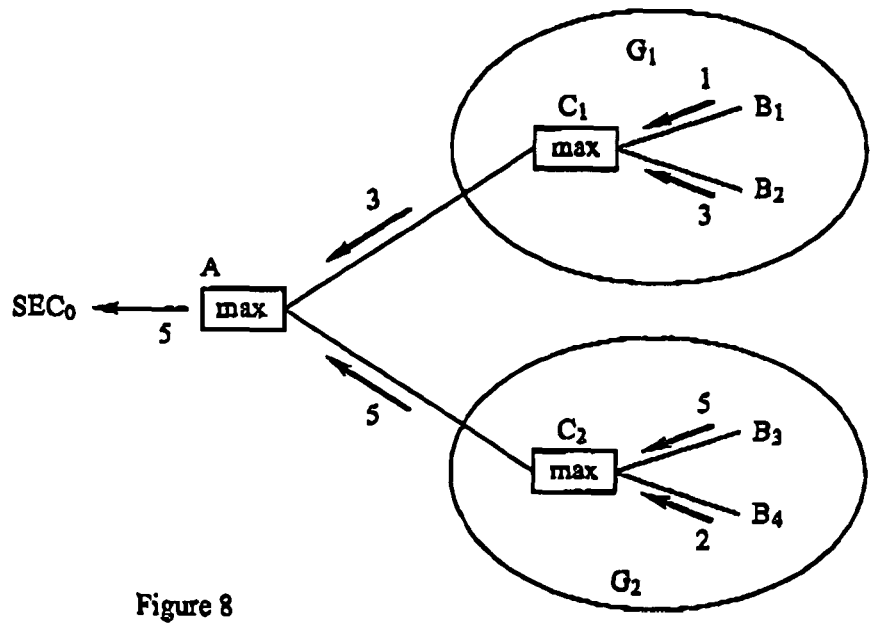
FIG. 8 is a schematic representation of another embodiment of the communication system.

As seen in FIG. 8, A sends a payload secured at protection level SEC to a group of devices consisting of B1-B4. The recipients B1-B4 provide feedback to the sender A on the expected protection level (indicated in the diagram as the integers 1, 3, 2, 5, where these integers are numbered in order of increasing protection level). The feedback is communicated back to A via intermediate nodes C1 and C2, who collect the respective feedbacks of devices in their respective groups G1 and G2 and process this, before returning a condensed acknowledge message representing both groups to sender A. The condensed feedbacks provided by these intermediate devices provides A with the same information on the minimum protection level that satisfies the expectations of all recipients as would have been the case if this information would have been forwarded to A without intermediate processing. (Here, we assume that the intermediate devices do not cheat in their calculations.)

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for communicating, comprising:
   generating a plurality of frames for communication destined to a recipient, each of the plurality of frames includes a header identifying a security level applied to associated data; and
   dynamically updating security levels associated with the plurality of frames based on acknowledgement messages from the recipient indicating expected security levels,
   wherein the plurality of frames includes a first frame and a second frame, and dynamically updating security levels comprises:
      transmitting, to the recipient, the first frame including a first header and first data, the first header identifying a first security level applied to the first data;
      receiving, from the recipient, an acknowledgement message identifying an expected security level;
      determining a second security level different from the first security level based on the received expected security level; and
      transmitting, to the recipient, a second frame including a second header and second data, the second header identifying the second security level applied to the second data.

2. The method of claim 1, wherein the second security level is a security level higher or lower than the first security level.

3. The method of claim 1, further comprising encrypting the first data in accordance with the first security level.

4. The method of claim 1, further comprising signing the first frame in accordance with the first security level.

5. The method of claim 1, further comprising:
   transmitting the plurality of frames to a plurality of recipients including the recipient; and
   dynamically updating security levels associated with the plurality of frames based on acknowledgement messages from the plurality of recipients indicating expected security levels.

6. The method of claim 5, where each security level is selected to satisfy the received expected security levels.

7. The method of claim 1, each of the expected security levels include a minimum security level of an associated recipient.

8. The method of claim 1, where each of the security levels is different.

9. A computer program product encoded on a tangible, non-transitory storage medium, the product comprising computer readable instructions for causing one or more processors to perform operations comprising:
   generating a plurality of frames for communication destined to a recipient, each of the plurality of frames includes a header identifying a security level applied to associated data; and dynamically updating security levels associated with the plurality of frames based on acknowledgement messages from the recipient indicating expected security levels, wherein the plurality of frames includes a first frame and a second frame, and dynamically updating security levels includes:

transmitting, to the recipient, the first frame including a first header and first data, the first header identifying a first security level applied to the first data;

receiving, from the recipient, an acknowledgement message identifying an expected security level;

determining a second security level different from the first security level based on the received expected security level; and transmitting, to the recipient, a second frame including a second header and second data, the second header identifying the second security level applied to the second data.

10. The computer program product of claim 9, wherein the second security level is a security level higher or lower than the first security level.

11. The computer program product of claim 9, the operations further comprising encrypting the first data in accordance with the first security level.

12. The computer program product of claim 9, the operations further comprising signing the first frame in accordance with the first security level.

13. The computer program product of claim 9, the operations comprising:

transmitting the plurality of frames to a plurality of recipients including the recipient; and dynamically modifying security levels associated with the plurality of frames based on acknowledgement messages from the plurality of recipients indicating expected security levels.

14. The computer program product of claim 13, each of the expected security levels include minimum security levels of an associated recipient.

15. The computer program product of claim 13, each security level is selected to satisfy the received expected security levels.

16. The computer program product of claim 9, each of the security levels is different.

17. A computing device, comprising:

one or more physical processors configured to:

generate a plurality of frames for communication destined to a recipient, each of the plurality of frames includes a header identifying a security level applied to associated data; and dynamically update security levels associated with the plurality of frames based on acknowledgement messages from the recipient indicating expected security levels, wherein the plurality of frames includes a first frame and a second frame, and dynamically updating security levels includes:

transmitting, to the recipient, the first frame including a first header and first data, the first header identifying a first security level applied to the first data;

receiving, from the recipient, an acknowledgement message including information identifying an expected security level;

determining a second security level different from the first security level based on the received expected security level; and transmitting, to the recipient, a second frame including a second header and second data, the second header identifying the second security level applied to the second data.

18. The computing device of claim 17, wherein the second security level is a security level higher or lower than the first security level.

19. The computing device of claim 17, the one or more processors configured to encrypt the first data in accordance with the first security level.

20. The computing device of claim 17, the one or more processors configured to sign the first frame in accordance with the first security level.

21. The computing device of claim 17, the one or more processors configured to:

transmit the plurality of frames to a plurality of recipients including the recipient; and dynamically modify security levels associated with the plurality of frames based on acknowledgement messages from the plurality of recipients indicating expected security levels.

22. The computing device of claim 21, each of the expected security levels include a minimum security level of an associated recipient.

23. The computing device of claim 21, each security level is selected to satisfy the received expected security levels.

24. The computing device of claim 17, each of the security levels is different.

25. A security method for communicating in a communication network, the method comprising:

obtaining expected security level data for a plurality of correspondents, wherein the expected security level data indicate that two or more of the plurality of correspondents have different expected security levels;

determining, by operation of one or more processors, a group security level that is acceptable to all of the plurality of correspondents based on the expected security level data; and obtaining a frame for transmission to the plurality of correspondents, the frame includes data and a header indicating a security level for the frame, wherein the security level for the frame meets the group security level.

26. The method of claim 25, wherein the correspondents are intermediate nodes in the communication network, the intermediate nodes are configured to forward the frame to one or more recipients.

27. The method of claim 25, wherein the correspondents are intended recipients of the frame.

28. The method of claim 25, wherein the expected security level data includes a set of expected security levels, and the method comprises:

an intermediate node in the communication network performing an ordering of the set; and the intermediate node sending a result of the ordering to a sender of the frame.

29. The method of claim 28, wherein the ordering is a Cartesian product of a natural ordering for encryption and a natural ordering for authentication.

30. The method of claim 25, wherein the expected security level data includes a partial ordering of a set of expected security levels.

31. The method of claim 25, wherein the security level for the frame is either higher than the group security level or equal to the group security level.

32. A computer program product encoded on a tangible, non-transitory storage medium, the product comprising computer readable instructions for causing one or more processors to perform operations comprising:

obtaining expected security level data for a plurality of correspondents, wherein the expected security level data indicate that two or more of the plurality of correspondents have different expected security levels;

determining, based on the expected security level data, a group security level that is acceptable to all of the plurality of correspondents; and obtaining a frame for transmission to the plurality of correspondents, the frame includes data and a header indicating a security level for the frame, wherein the security level for the frame meets the group security level.

33. The computer program product of claim 32, wherein the correspondents are intermediate nodes in a communication network, and the intermediate nodes are configured to forward the frame to a recipient.

34. The computer program product of claim 32, wherein the correspondents are intended recipients of the frame.

35. The computer program product of claim 32, wherein the expected security level data includes a set of expected security levels, and the operations include:

performing an ordering of the set at an intermediate node in a communication network; and sending a result of the ordering from the intermediate node to a sender of the frame.

36. The computer program product of claim 35, wherein the ordering is a Cartesian product of a natural ordering for encryption and a natural ordering for authentication.

37. The computer program product of claim 32, wherein the expected security level data includes a partial ordering of a set of expected security levels.

38. A computing device in a communication network, the computing device comprising:

one or more physical processors processor configured to:

obtain expected security level data for a plurality of correspondents, wherein the expected security level data indicate that two or more of the plurality of correspondents have different expected security levels;

determine, based on the expected security level data, a group security level that is acceptable to all of the plurality of correspondents; and obtain a frame for transmission to the plurality of correspondents, the frame includes data and a header indicating a security level for the frame, wherein the security level for the frame meets the group security level.

39. The computing device of claim 38, wherein the computing device is a sender of the frame, and the correspondents are intermediate nodes in the communication network.

40. The computing device of claim 38, wherein the computing device is an intermediate node in a communication network, the correspondents are intended recipients of the frame, and obtaining the frame includes receiving the frame from a sender of the frame.

41. The computing device of claim 40, wherein the expected security level data includes a set of expected security levels, and the one or more processors are configured to:

perform an ordering of the set; and send a result of the ordering to the sender of the frame.

42. The computing device of claim 41, wherein the ordering includes a Cartesian product of a natural ordering for encryption and a natural ordering for authentication.

43. The computing device of claim 38, wherein the expected security level data includes a partial ordering of a set of expected security levels.

\* \* \* \* \*

UNITED STATES PATENT AND TRADEMARK OFFICE
CERTIFICATE OF CORRECTION

PATENT NO.        : 8,640,253 B2
APPLICATION NO.   : 13/551869
DATED             : January 28, 2014
INVENTOR(S)       : Struik Page 1 of 1

It is certified that error appears in the above-identified patent and that said Letters Patent is hereby corrected as shown below:

In the Claims

Column 10, Line 1, Claim 38, after "processors" delete "processor".

Signed and Sealed this
Sixteenth Day of September, 2014

Michelle K. Lee
*Deputy Director of the United States Patent and Trademark Office*